Patented Apr. 1, 1930

1,752,580

UNITED STATES PATENT OFFICE

HARRY STIRLING SNELL, OF LA GRANGE, ILLINOIS, ASSIGNOR TO WESTERN ELECTRIC COMPANY, INCORPORATED, OF NEW YORK, N. Y., A CORPORATION OF NEW YORK

MOLDING COMPOUND AND ITS METHOD OF PRODUCTION

No Drawing. Original application filed November 8, 1924, Serial No. 748,525. Divided and this application filed February 28, 1927. Serial No. 171,724.

This invention relates to molding compounds and their method of production and is a division of my copending application Serial No. 748,525, filed November 8, 1924.

The object of the invention is to produce a composition with great resistance to moisture suitable for use as a molding compound.

According to the main features of the invention, a protein, preferably casein, is dissolved in an aqueous solution of caustic soda to produce a solution of a water soluble caseinate. A water solution of a salt of an organic acid, preferably a solution of castile soap, is then added to the aqueous caseinate solution and a solution of aluminum acetate is added to the resulting mixture. A double decomposition takes place and the insoluble constituents formed are precipitated out of solution. The precipitate is an intimate mixture of an insoluble caseinate and an insoluble soap, specifically aluminum caseinate and aluminum oleate, where the preferred constituents are used.

This precipitated material may then be hardened with a suitable hardening agent, such as picric acid, tannic acid, a chromate or an aldehyde. Furfural, a substantially anhydrous aldehyde, may be combined with the precipitate to cause a condensation thereof, in the manner described in Patent No. 1,648,179, granted Nov. 8, 1927, to S. M. Hull.

Other objects and features of the invention will be apparent from the following detailed description and will be particularly pointed out in the appended claims.

It is common practice to incorporate various proteins with materials such as formaldehyde, acetaldehyde or furfural to produce a hard, difficultly fusible and soluble condensation product. Although such condensation products are in general insoluble in water, they will absorb a great deal of moisture and sometimes swell considerably on that account. It has been proposed to incorporate various waterproofing materials with the casein before condensation thereof, but there is sometimes considerable difficulty in obtaining a proper mixture of the casein and the waterproofing material.

According to the main features of this invention as defined in a preceding paragraph, in order to obtain an intimate mixture of the protein and waterproofing material, they are precipitated in the presence of each other so as to obtain a more nearly molecular mixture than is obtainable by other methods heretofore used. Not only is it possible by the present method to obtain a substantially molecular mixture of a waterproofing material with a protein, but a proteinate is formed which is itself insoluble.

In the production of compounds of this nature a great many different proteins either of vegetable origin such as zein or soy-bean casein or of animal origin, such as gelatine, milk casein and albumin may be employed. For the sake of clearness, however, hereinafter in this description the word "casein" will be employed to designate generally this type of compound.

The first step in the production of the improved composition is to obtain an aqueous solution of a soluble caseinate. Although considerable latitude exists, it is preferable to dissolve casein, preferably a high grade, low acidity, low fat content casein, in an aqueous solution of caustic soda. Other materials which may be used in the same way as the caustic soda are any of the alkaline earth hydroxides, alkalies, borates, phosphates, sodium silicates, and the like. To the solution of soluble caseinate produced by the reaction which takes place is then added a solution of a salt of an organic acid, such as the sodium or potassium salts of linoleic, palmitic, stearic, oleic, or resin acids or mixtures of these. These two solutions being mixed together, a material capable of causing the production of an insoluble caseinate and an insoluble salt of an organic acid and the simultaneous precipitation of these compounds is added. Such precipitants may be alkaline earth, aluminum or zinc salts, and may be any metallic salt of a strong or weak acid or combinations of these. The weak acid salts, such as acetates, are preferable because if they are present in greater proportions than can unite chemically with the other constituents of the reactions and the excess be not afterwards washed out entirely, they do very little harm. If a strong acid, however, exists in a free state or in the form of a salt in the composition, it forms a fairly good conductor for electricity and where the composition is used as a dielectric, this condition is undesirable.

When all of the constituents have been incorporated and precipitation has taken place, the precipitate is thoroughly washed and dried and can then be incorporated with any of the standard hardening agents, such as picric acid, tannic acid, chromates and aldehydes, which are generally used with casein to produce a hard condensation product. Such a hardening agent may be any aldehyde in sufficient proportions for hardening the casein. When a water soluble aldehyde is used it is possible to produce the precipitate in its presence. However, as suggested above the precipitated material may be dried first and mixed with a hardening agent and pressed or may be pressed and hardened afterwards. Examples of the aldehydes which may be used are furfural, acetaldehyde, formaldehyde or any reactive methylene compound.

The proportion of salt of an organic acid used will determine the degree of insolubility and water resistance, the hardness, the surface lustre and other characteristics of the final product. While the exact optimum percentages will differ depending upon the properties desired in the finished product, it is believed that salt of an organic acid in the proportions of from 1 to 10% of the casein present may be used advantageously. A greater amount of salt increases the insolubility, but decreases to a certain extent the hardness obtainable in the final product.

As an example of the process high grade casein having a low acidity and low fat content is dissolved to the extent of about 10% in an aqueous solution of caustic soda in which has been previously dissolved castile soap (sodium oleate) equivalent to about 5% of the weight of the casein. The solution, when complete, is warmed to about 45° C. and a 10% solution of aluminum acetate added while rapidly agitating the mixture. The precipitate in this case, probably a mixture of aluminum caseinate and aluminum oleate, is allowed to settle and the excess liquid drawn off. The precipitate is partially dried by whirling it in a centrifugal wringer and then washing once or twice with water to remove the electrolytes, in this case sodium acetate which is formed by double decomposition and possibly excess aluminum acetate. It is then wrung again after which it may be mixed with a filler such as clay, zinc oxide, mica, etc. by means of a pebble mill or a kneading machine.

The mixture may then be hardened in the usual manner by an aldehyde, preferably furfural. If furfural is used, it can be introduced in the liquid form, about 1.5% being used, based on the weight of the casein. The mixture of aluminum caseinate and aluminum oleate should be thoroughly dried prior to mixing with furfural. An alternate arrangement is to add to the solution before the precipitation of the caseinate an aldehyde equivalent (in the case of formaldehyde) to about 4% of the weight of the casein.

A filler may be introduced into the liquid before precpitation so that if the agitation is sufficiently violent as to maintain the filler in suspension, the precipitant may be added and the precipitate formed with the particles of filler acting as condensation or precipitation nuclei. In this way a more perfect mixture of filler, caseinate and organic salt can be obtained than would be possible by mechanical means.

The heating of the solutions referred to above has the effect of causing an agglomeration of the precipitate so as to make it easier to handle. It has no effect on the reaction, however, and the process may be carried on with all of the constituents at room temperature.

By hardening or condensation of the casein by means of an aldehyde it is meant a chemical reaction takes place between the amino groups of the casein and the aldehyde, water being liberated and a new compound of greater molecular weight being formed. Such a compound is less soluble and absorbs less moisture than the original material.

What is claimed is:

1. A method of producing a molding compound which consists in precipitating simultaneously and jointly by a common precipitant a water insoluble caseinate and an insoluble salt capable of waterproofing the compound, and adding furfural to the precipitate to form a condensation product.

2. A method of producing a molding compound which consists in precipitating simultaneously and jointly by a common precipitant a water insoluble caseinate and an insoluble salt capable of waterproofing the compound, washing and drying the precipitate, and adding furfural to the dried product.

3. A method of producing a molding compound which consists in precipitating simultaneously and jointly by a common precipitant a water insoluble caseinate and an aluminum oleate, and adding furfural to the precipitate.

4. A method of producing a molding compound which consists in precipitating simultaneously and jointly by a common precipitant a water insoluble caseinate and an aluminum oleate, washing and drying the precipitate, and adding furfural to the dried product.

5. A method of producing a plastic composition, which consists in forming a solution of a soluble proteinate and a salt of a fatty acid, adding a substance thereto to cause a double decomposition and simultaneous precipitation of a water insoluble proteinate and an insoluble salt of the fatty acid, and treating the resulting product with furfural.

6. A method of producing a molding composition, which consists in forming a solution of a soluble caseinate and a soluble soap, adding a substance thereto to cause a double decomposition and simultaneous precipitation of a water insoluble caseinate and an insoluble soap, and treating the resulting precipitate with furfural.

7. A method of producing a molding composition, which consists in forming a solution of a soluble caseinate and a soluble soap, adding a substance thereto to cause a double decomposition and simultaneous precipitation of a water insoluble caseinate and an insoluble soap, and treating the resulting precipitate with furfural.

8. A method of producing a molding composition, which consists in forming a solution of a soluble caseinate and a soluble soap, adding a metal salt thereto to precipitate a metal caseinate and a metal soap, and treating the resulting precipitate with furfural.

9. A method of producing a molding composition, which consists in forming a solution of a soluble caseinate and a soluble oleate, adding aluminum acetate thereto to jointly and simultaneously precipitate aluminum caseinate and aluminum oleate, and treating the resulting precipitate with furfural.

10. A method of producing a molding composition, which consists in precipitating simultaneously and jointly by a common precipitate a water insoluble proteinate and an insoluble salt of a fatty acid, and adding furfural to the precipitate.

11. A method of producing a molding compound, which consists in precipitating simultaneously and jointly by means of aluminum acetate an aluminum proteinate and an aluminum salt of a fatty acid, and adding furfural to the precipitate.

12. A method of producing a molding compound, which consists in precipitating simultaneously and jointly by means of aluminum acetate an aluminum caseinate and an aluminum oleate, and adding furfural to the precipitate.

In witness whereof, I hereunto subscribe my name this 18th day of February, A. D., 1927.

HARRY STIRLING SNELL.